3,365,471
PRODUCTION OF NITROGENOUS
DIEPOXIDES
Friedrich Becke, Heidelberg, and Bruno Sander, Ludwigshafen (Rhine), Germany, assignors to Badische Anilin- & Soda-Fabrik Aktiengesellschaft, Ludwigshafen (Rhine), Germany
No Drawing. Filed June 23, 1964, Ser. No. 377,396
Claims priority, application Germany, June 25, 1963,
B 72,409
2 Claims. (Cl. 260—348)

ABSTRACT OF THE DISCLOSURE

Nitrogenous diepoxides of the first formula below wherein R is hydrogen or alkyl of 1-4 carbons, such as glycol bisglycidamide, and preparation thereof by reaction of a glycidyl carboxylic amide and glyoxal in an organic solvent and 0.5 to 45% by weight water at pH 7 to 8 and at 0–50° C. The products are useful as additives for conventional adhesive powders derived from urea and formaldehyde.

This invention relates to a process for the production of new nitrogenous compounds containing two epoxide groups in the molecule, and also to the compounds themselves.

It is known that compounds containing two epoxy groups in the molecule can be obtained by oxidation of diolefins. It is also known for example that diglycidyl is obtained by reaction of two molecules of epichlorohydrin with metallic sodium. This method is very dangerous and is very difficult to carry out on a technical scale.

It is an object of this invention to provide a process for the production of new valuable nitrogenous compounds containing two epoxide groups in the molecule. Another object of this invention is to provide a process for the production of the said compounds which can be carried out very simply and without danger. Another object of this invention is to provide the substances produced by the process.

We have found that nitrogenous diepoxides having the general formula:

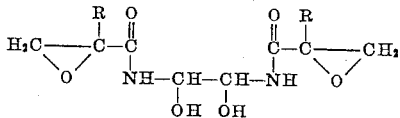

in which R may denote a hydrogen atom or an alkyl group having one to four carbon atoms are obtained by reacting a carboxylic amide having the general formula:

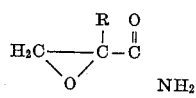

in which R has the above meaning, with glyoxal in the presence of an organic solvent and/or suspension agent and water, the water content, with reference to the whole reaction mixture, being 0.5 to 45% by weight and the pH valve preferably being between 7 and 8. It is expedient to work at a water content between 5 and 35% by weight.

Taking the reaction of glycidamide with glyoxal as an example, the process may be represented by the following equation:

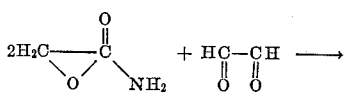

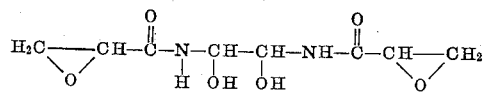

Examples of initial materials which may be used are α-methylglycidamide or α-butylglycidamide. It is preferred to use glycidamide. The compounds may readily be prepared by the process described in copending application Ser. No. 236,440, filed Nov. 8, 1962 by Friedrich Becke, Heinz Buckschewski, and Bruno Sander, now U.S. Patent No. 3,217,016, issued Nov. 9, 1965.

The reaction is carried out in the presence of organic solvents or suspension agents. Particularly suitable solvents are for example lower alkanols or cycloalkanols having one to six carbon atoms, such as methanol, ethanol, propanol, butanol, and cyclohexanol; acetals of aldehydes having one to four carbon atoms with lower alkanols having one to four carbon atoms, such as formaldehyde dimethylacetal, acetaldehyde dimethylacetal and acetaldehyde-diethylacetal. Examples of other solvents which may be used are ethers having four to ten carbon atoms, such as ethylene glycol monoethyl ether or anisol; or ketones having three to eight carbon atoms, such as acetone, methyl ethyl ketone and diethyl ketone. The solvents and/or suspension agents may be used singly or in combination.

The reaction is carried out in the presence of 0.5 to 45%, preferably 5 to 35% by weight of water with reference to the reaction mixture. The water may be introduced into the reactor in the form of aqueous initial materials and/or solvents or may be added direct to the reactor. The initial materials are as a rule used in stoichiometric amounts. One or other initial material may however be used in excess, for example a 1.1 to 5 molar excess. Particularly good yields of the new substances are obtained when the reaction is carried out at a pH between 7 and 8. To set up this pH, alkaline reacting substances, as for example the hydroxides, carbonates or hydrogen carbonates of the alkali metals, particularly of potassium or sodium may be used. Examples of these substances are sodium hydrogen carbonate, potassium hydrogen carbonate, sodium carbonate, potassium carbonate, sodium hydroxide or potassium hydroxide. As a rule the process is carried out at temperatures between 0° and 50° C. It is advantageous to work at room temperature, i.e. a temperature between 10° and 30° C. It is furthermore advantageous to stir the reaction mixture during the reaction.

The reaction mixture is worked up by suction filtration of the precipitated product. A further amount of the desired product may be recovered by concentration of the mother liquor. The diepoxides prepared in the way described are as a rule obtained in very pure form and do not need to be further purified.

The new compounds are valuable intermediates for the production of plastics, lacquers and adhesives.

For example, by adding 1 to 10 wt. percent glycol bis-glycidamide to an aqueous mixture of a conventional adhesive powder derived from urea and formaldehyde and a hot hardener derived from ammonium chloride, ammonia and urea, the failing load of bonded beechwood can be considerably increased.

The invention is further illustrated by the following examples. Parts, unless otherwise stated, are parts by weight. Parts by weight and parts by volume bear the same relation as the gram and the ccm.

*Example 1*

87 parts of glycidamide, 71 parts of 41% aqueous glyoxal neutralized with sodium hydrogen carbonate and a mixture of 150 parts of acetaldehyde dimethylacetal and 50 parts of methanol are allowed to act on each other for thirty-six hours at room temperature. A pH value of 7.0 to 7.1 is maintained during the course of the reaction with an aqueous sodium hydrogen carbonate solution. When the reaction is over, the crystals are suction filtered and washed with about 100 parts of methanol.

99.5 parts of glycol bis-glycidamide having a melting point of 143° to 144° C. is obtained, corresponding to a yield of 85.8% of the theory with reference to the glyoxal used.

*Example 2*

The procedure of Example 1 is adopted but 200 parts of ethanol is used as the solvent. After a reaction period of about four days, 94 parts of glycol bis-glycidamide having a melting point of 143° to 144° C. is obtained corresponding to a yield of 81% of the theory with reference to glyoxal used.

*Example 3*

The prodecure of Example 1 is followed but 200 parts of normal-propanol is used as solvent. After a reaction period of about thirty-six hours, 88.5 parts of glycol bis-glycidamide having a melting point of 143° to 144° C. is obtained corresponding to a yield of 76.3% of the theory with reference to the glyoxal used.

*Example 4*

The procedure described in Example 1 is followed, but 200 parts of ethylene glycol monoethyl ether is used as the solvent. After a reaction period of about twenty-four hours, 82 parts of glycol bis-glycidamide having a melting point of 143° to 144° C. is obtained, corresponding to a yield of 70.7% of the theory with reference to the glyoxal used.

*Example 5*

The procedure described in Example 1 is adopted, but 200 parts of methyl ethyl ketone is used as the solvent. After a reaction period of about twenty-four hours, 79.5 parts of glycol bis-glycidamide having a melting point of 143° to 144° C. is obtained corresponding to a yield of 68.6% of the theory with reference to the glyoxal used.

*Example 6*

Using the procedure described in Example 1, 200 parts of anisol is used as the solvent or suspension agent. After a reaction period of about four days, 86 parts of glycol bis-glycidamide having a melting point of 143° to 144° C. is obtained, corresponding to a yield of 74.1% of the theory with reference to glyoxal used.

We claim:
1. A nitrogenous diepoxide having the general formula

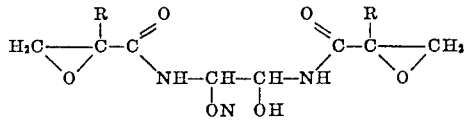

where R denotes a member selected from the group consisting of hydrogen and alkyl with 1 to 4 carbon atoms.
2. Glycol bis-glycidamide.

References Cited

UNITED STATES PATENTS

| | | | |
|---|---|---|---|
| 2,676,936 | 4/1954 | Schofield | 260—561 X |
| 3,038,010 | 6/1962 | Tawney | 260—561 |
| 3,087,965 | 4/1963 | Dowbenko et al. | 260—561 |
| 3,112,155 | 11/1963 | Vail et al. | 8—116.2 |
| 3,253,030 | 5/1966 | Buc | 260—561 |

FOREIGN PATENTS

| | | |
|---|---|---|
| 413,345 | 7/1934 | Great Britain. |
| 1,003,752 | 3/1957 | Germany. |
| 801,991 | 9/1958 | Great Britain. |
| 641,267 | 4/1964 | Belgium. |

NORMA S. MILESTONE, *Primary Examiner.*

UNITED STATES PATENT OFFICE
CERTIFICATE OF CORRECTION

Patent No. 3,365,471                              January 23, 1968

Friedrich Becke et al.

It is certified that error appears in the above identified patent and that said Letters Patent are hereby corrected as shown below:

Column 4, lines 13 to 18, the portion of the formula reading 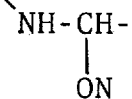 should read 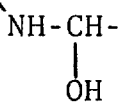

Signed and sealed this 16th day of December 1969.

(SEAL)
Attest:

Edward M. Fletcher, Jr.                      WILLIAM E. SCHUYLER, JR.
Attesting Officer                                     Commissioner of Patents